Inventor:
Donald J. Stefanik
By Mason, Kolehmainen, Rathburn & Wyss
Att'ys

NOISE REJECTION CIRCUIT

Inventor:
Donald J. Stefanik
By
Mason, Kolehmainen, Rathburn & Wyss
Att'ys

United States Patent Office 3,539,722

Patented Nov. 10, 1970

3,539,722

NOISE REJECTION CIRCUIT

Donald J. Stefanik, Berwyn, Ill., assignor to SCM Corporation, New York, N.Y., a corporation of New York Filed Oct. 28, 1968, Ser. No. 770,953
Int. Cl. H04l 25/08
U.S. Cl. 178—69 7 Claims

ABSTRACT OF THE DISCLOSURE

The application discloses a digital timer for rejecting noise and other spurious signals supplied from a two level signaling channel. A counting circuit preset to normal by each line transistion is driven by clock sigals to a setting representing known elapsed time comprising a fixed percentage of an expected normal signal. This setting of the counting circuit is decoded in a logic gate to enable use of the received signal. The receipt of a signal transition during the known elapsed time period resets the counter and prevents signal use.

BACKGROUND OF THE INVENTION

This invention relates to a noise rejection circuit and, more particularly, to a noise rejection circuit using digital techniques and adapted for use in data transmission systems.

Many data handling units and data transmission systems include various types of circuits for removing or ignoring spurious signals associated with the desired intelligence signals. One approach frequently used involves the reshaping or reconstruction of the received signal. Another approach that can be used with variable level signals of suitable durations, such as the mark and space signals used in telegraphy, is to use timing or delay devices triggered by a line level transition to enable use of the received signal only after the transitional part of the signal has passed. This technique has the advantage that a substantial portion of the spurious signals normally encountered are frequently associated with the transitional period.

However, the circuitry previously used to carry out this type of noise rejection often requires the use of monostable timers with integrating networks and level sensing amplifiers which are both comparatively expensive and may require cascading to avoid the appearance of integrating transitions at the amplifier output. Further, these circuits are frequently insensitive to momentary line changes during the delay interval, and the operating tolerances of these circuits are not easily maintained.

SUMMARY

The present invention provides a noise rejection circuit using digital techniques to delay the response of a signal utilization device until the absence of spurious signals is detected for a given period of time during which the signaling channel is continuously monitored. Commonly, the fixed delay interval comprises a known percentage of an expected normal signal, and the timing tolerance of the circuit is positively maintained during circuit operation by virtue of the digital techniques used.

More specifically, the noise rejection circuit of the invention includes a counting circuit preset to a normal state in response to each transition in the level of an input signaling channel or channel output signal and operated by clock pulses to settings representing closely controlled increments of elapsed time. The settings of the counter are decoded in a logic gate to enable a signal utilization device to respond to the signals received from the channel after a known elapsed time period or delay interval. The signal utilization device is enabled only if the incoming signal has been free of any level transitions during the delay interval because the counting circuit is preset or reset to a normal setting by a detecting circuit which continuously monitors the incoming channel for signal level transitions. The circuit also includes an additional logic gate for inhibiting further operation of the counting circuit after the signal utilization device has been enabled.

BRIEF DESCRIPTION OF THE DRAWINGS

Many other objects and advantages of the present invention will become apparent from considering the following detailed description in conjunction with the drawings in which.

DESCRIPTION OF THE PREFERRED EMBODIMENT

Figure 1:
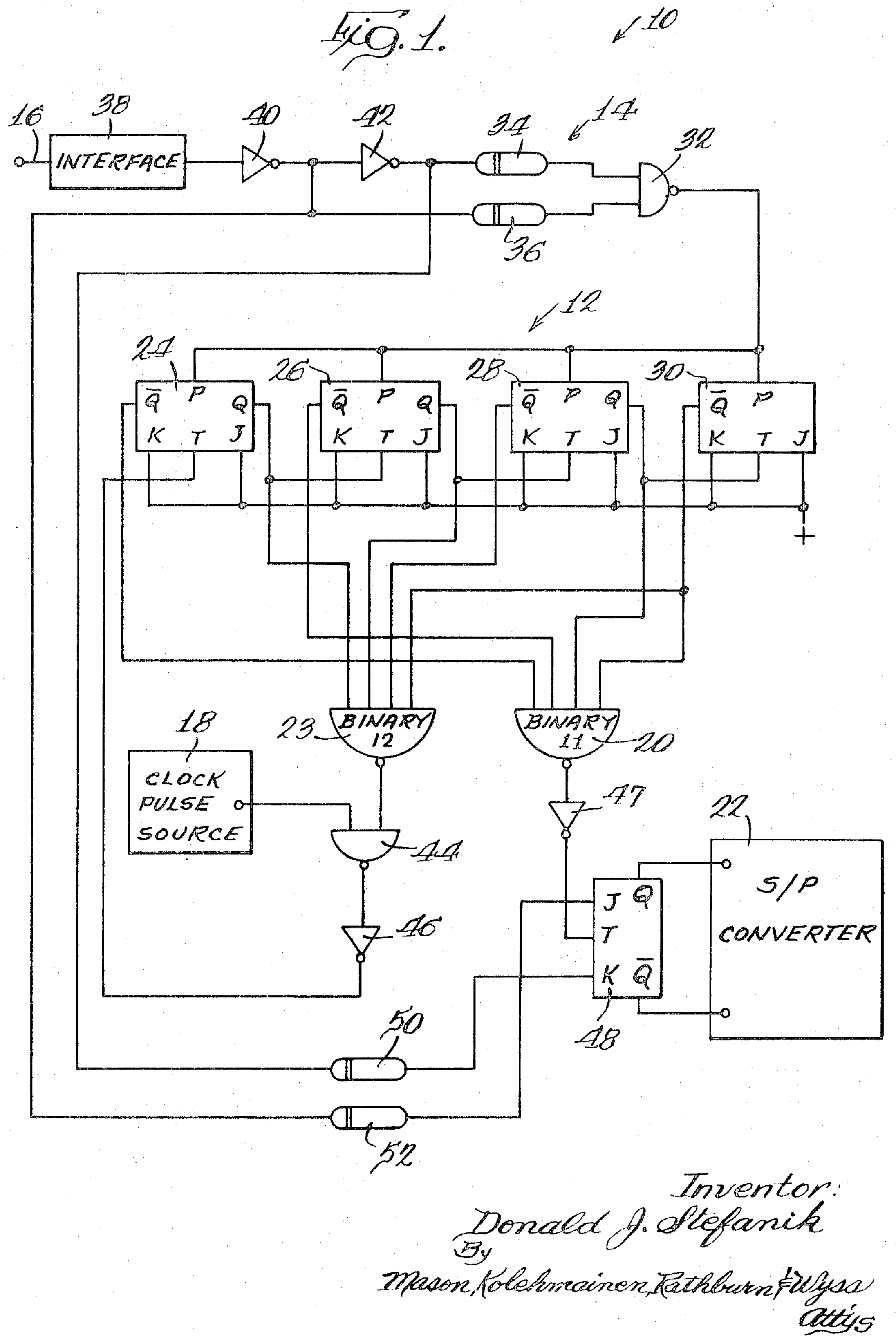
FIG. 1 is a circuit diagram in logic schematic form illustrating a noise rejection circuit embodying the present invention.

Referring now more specifically to FIG. 1 of the drawings, therein is illustrated a noise rejection circuit which embodies the present invention and which is generally indicated as 10. The circuit 10 includes a counting circuit 12 preset to a normal setting by detecting means 14 in response to each level transition on an incoming signaling channel 16. The counting circuit is driven from a clock pulse source 18 from the normal setting to different settings representing increments of time elapsed since the last line transition. When the counting circuit 12 attains a predetermined setting representing a known elapsed time, a logic gate 20 is enabled to render a signal utilization device or means 22 responsive to the signal received from the signaling channel 16. When the counting circuit 12 is advanced to its next setting, a logic gate 23 inhibits further operation of the counting circuit 12 by the clock pulse source 18 until the next line transition is received. If noise or other spurious signals resulting in a level transition on the channel 16 is detected by the detector 14 prior to the enabling of the logic gate 20, the counting circuit 12 is preset to its normal condition, and the gate 20 is not permitted to enable the signal utilization device 22 until the signaling channel 16 remains free of level transitions for the predetermined period of time.

The counting circuit 12 comprises four stages 24, 26, 28, and 30 formed of conventional JK flip-flops, the J and K terminals of which are returned to a positive potential and the clock or "T" terminals of which are coupled to the Q output of the preceding flip-flip in the chain. The clock input of the first stage 24 provides an input to which the signals from the clock pulse source 18 are applied. Thus, the counting circuit 12 provides a four stage binary counter. The prime terminals of the stages or flip-flops 24, 26, 28, and 30 are connected together and to the output of the detecting circuit 14. The application of a positive-going signal or pulse to the P terminals presets the counter 12 to a normal state in which a more positive potential is applied to the Q terminal of each of these stages and a more negative potential is applied to the $\overline{Q}$ terminal of each of the stages.

As set forth above, the detecting circuit 14 presets the counting circuit to its normal setting, and the detecting circuit 14 includes a NAND gate 32, the output of which is coupled to the P terminals of the flip-flops 24, 26, 28, and 30. The two inputs to the NAND gate 32 are each connected to the output of one of a pair of delay lines 34 and 36. These two delay lines are connected as monostable circuits providing a brief delay on the order of four microseconds to the leading edge of an incoming negative-going signal. The inputs to the delay lines 34 and 36 are driven from the signaling channel.

More specifically, the signaling channel 16 is coupled through an interface circuit 38 and a pair of inverters 40 and 42 to the input of the delay line 34. The input of the delay line 36 is coupled to the output of the inverter 40. As an illustrative example, the interface 38 supplies a high level signal representing a space and a low level signal representing a mark so that the delay line 34 receives a negative-going signal on each space-to-mark line transition, and the input to the delay line 36 receives a negative-going signal on mark-to-space transitions.

The two delay lines 34 and 36 normally supply high level inputs to the two inputs to the NAND gate 32 (see FIG. 2) so that the output of this gate is normally held at a low level. When a negative-going transition is supplied to the input of the delay line 34, a short negative-going pulse is supplied from the output thereof to the upper input of the NAND gate 32, and a corresponding positive-going pulse is applied to the P terminals of the flip-flops in the counter 12 to preset the counter to its normal state. Similarly, when a negative-going transition is applied to the input of the delay line 36, a brief negative-going pulse is applied to the lower input of the NAND gate 32 to reset the counter 12 on mark-to-space transitions. Thus, the detecting circuit 14 continuously monitors the signaling channel 16 for a level transition and resets the counter 12 to its normal state in response to each detected level transition. The relevant waveforms are illustrated in the first five lines in FIG 2.

The presetting of the counting circuit 12 to its normal condition renders the clock pulse source 18 effective to initiate operation of the counting circuit under the control of the gate 23 and an additional gate 44. The four inputs to the NAND gate 23 are connected to the Q, Q, $\overline{Q}$, and $\overline{Q}$ outputs of the stages 24, 26, 28, and 30, respectively. The $\overline{Q}$ outputs of the stages 28 and 30 are low in the above-identified preset condition of the counting circuit 12, and the output of the gate 23 thus rises to a more positive potential. This output from the gate 23 is applied to one input of the gate 44 to enable this gate so that the clock pulses from the source 18 (see FIG. 2) applied to the other input to the gate 44 are repeated through an inverter 46 to the clock input of the input flip-flop 24 of the counting circuit 12.

The clock pulse source 18 is disabled by applying an inhibit to the right-hand input of the gate 44 when twelve clock pulses have been applied to the counter 12 and the counting circuit 12 has been advanced through twelve steps or settings. As illustrated in lines 7–10 in FIG. 2, when twelve clock pulses have been applied to the input of the counting circuit 12, the Q outputs of the stages 24 and 26 are high, and the $\overline{Q}$ outputs of the stages 28 and 30 are high. Thus, the NAND gate 23 is fully enabled and its output drops to a lower potential inhibiting the gate 44 so that no further input pulses can be applied to the counting circuit 12 (see line 11 in FIG. 2).

The frequency of the clock pulses from the source 18 together with the settings of the counting circuit 12 used to control the gates 20 and 23 determines not only the delay interval before an incoming signal is accepted as valid, but also the design timing tolerance. In one system 10 constructed in accordance with the present invention, the clock pulse source 18, which may be of any conventional design such as a counting chain driven by a crystal controlled oscillator, provides clock pulses at a rate 256 greater than the maximum bit rate at which mark and space bits of information are received from the incoming channel 16. Since the measured interval provided by the counting circuit 12 includes around twelve clock pulses, the circuit 10 is designed to accept as valid the signaling channel level that has persisted for approximately five percent of a normal pulse width with a tolerance of plus or minus .4 percent. If, for example, the circuit 10 is designed for use with a bit rate of 150 bits per second and is used, for example, with a signaling channel with a bit rate of 50 bits per second, the five percent spurious signal rejection is maintained, but the tolerance is improved to plus or minus approximately .1 percent.

As set forth above, the logic gate 20 controls the response of the signal utilizing device 22 which can comprise, for instance, a serial to parallel converter for the incoming signal received from the signaling channel 16. This control is exercised through an inverter 47 connected between the output of the NAND gate 20 and the clock input terminal of a JK flip-flop 48. The Q and $\overline{Q}$ outputs of the flip-flop 48 are connected to the mark and space input terminals, respectively, of the signal utilizing device 22. The J input terminal to the flip-flop 48 is connected to the output of a delay line 50, the input of which is connected to the output of the inverter 42. The K input terminal to the flip-flop 48 is connected to the output of a delay line 52, the input of which is connected to the output of the inverter 40. The inverters 40 and 42 and the delay lines 50 and 52 selectively supply a more positive potential to either the J or K input to the flip-flop 48 in dependence on whether a marking or spacing condition is received from the channel 16. The gate 20 and the inverter 47 selectively supply a positive-going signal to the clock terminal of the flip-flop 48 on the leading edge of the eleventh input pulse to the counter to, at that time, selectively set the flip-flop 48 in accordance with the input potentials supplied to the J and K terminals.

More specifically, the four inputs to the NAND gate 20 are connected to the $\overline{Q}$, $\overline{Q}$, Q and $\overline{Q}$ outputs of the counter stages 24, 26, 28, and 30. At least one of these inputs is held at a more negative or lower potential from the time that the counting circuit 12 is preset to its normal condition until such time as the positive-going leading edge of the eleventh clock pulse is received. At that time, all of the inputs to the NAND gate 20 are at a more positive potential (see lines 7–10 in FIG. 2), and the output of the gate 20 drops to a more negative potential. This signal is inverted at the inverter 47, and a more positive potential is applied to the clock terminal (see line 12 in FIG. 2). This sets the flip-flop 48 in accordance with the potential applied to the J and K terminals and thus renders the signal on the incoming channel 16 effective to control the data utilizing device 22 (see last line in FIG. 2).

The delay lines 50 and 52 are interposed between the J and K terminals of the flip-flop 48 and the outputs of the inverters 40 and 42, respectively, to avoid any possibility of a race between the setting of the flip-flop 48 at the leading or positive-going edge of the clock pulse provided at the output of the inverter 47 and any spurious signal or change in the level of the incoming line 16 that might occur coincident with the clocking of the flip-flop 48. More specifically, the delay lines 50 and 52 provide a delay on the order of 9 microseconds to a negative-going input signal and provide an output that follows the input (see FIG. 2). Thus, the delay lines 50 and 52 provide a DC level to the connected J and K terminals of the flip-flop 48 to permit the flip-flop to be set on the clock pulse provided by the inverter 47. Because of the delay inserted by the lines 50 and 52, a change in the level of the incoming line 16 occurring at the same time that the flip-flop 48 to permit this flip-flop to be set on the clock pulse trolling DC potential applied to the J and K terminals until 9 microseconds later with the result that the flip-flop 48 is set in accordance with the previously existing line condition.

As an example, when the operation of the noise rejection circuit 10 is initiated by a space-to-mark transition resulting in a negative-going signal at the output of the interface unit 38, the four microsecond delay afforded by the delay line 34 operating as a monostable clears the counter 12 and starts the timing interval. The positive-going transition at the output of the inverter 40 is reflected directly through the line 52 to provide a more positive potential to the J terminal representing the received mark pulse, and the delay line 50 supplies a more negative signal to the K terminal of the flip-flop 48 after a 9 microsecond delay (see FIG. 2). At the start of the eleventh clock pulse when the output of the inverter 47 goes to a more positive level, the flip-flop 48 is set to provide a more positive potential on the Q terminal and a more negative potential on the $\overline{Q}$ terminal to supply the data utilization device 22 with a signal representing the received mark signal.

Figure 2:
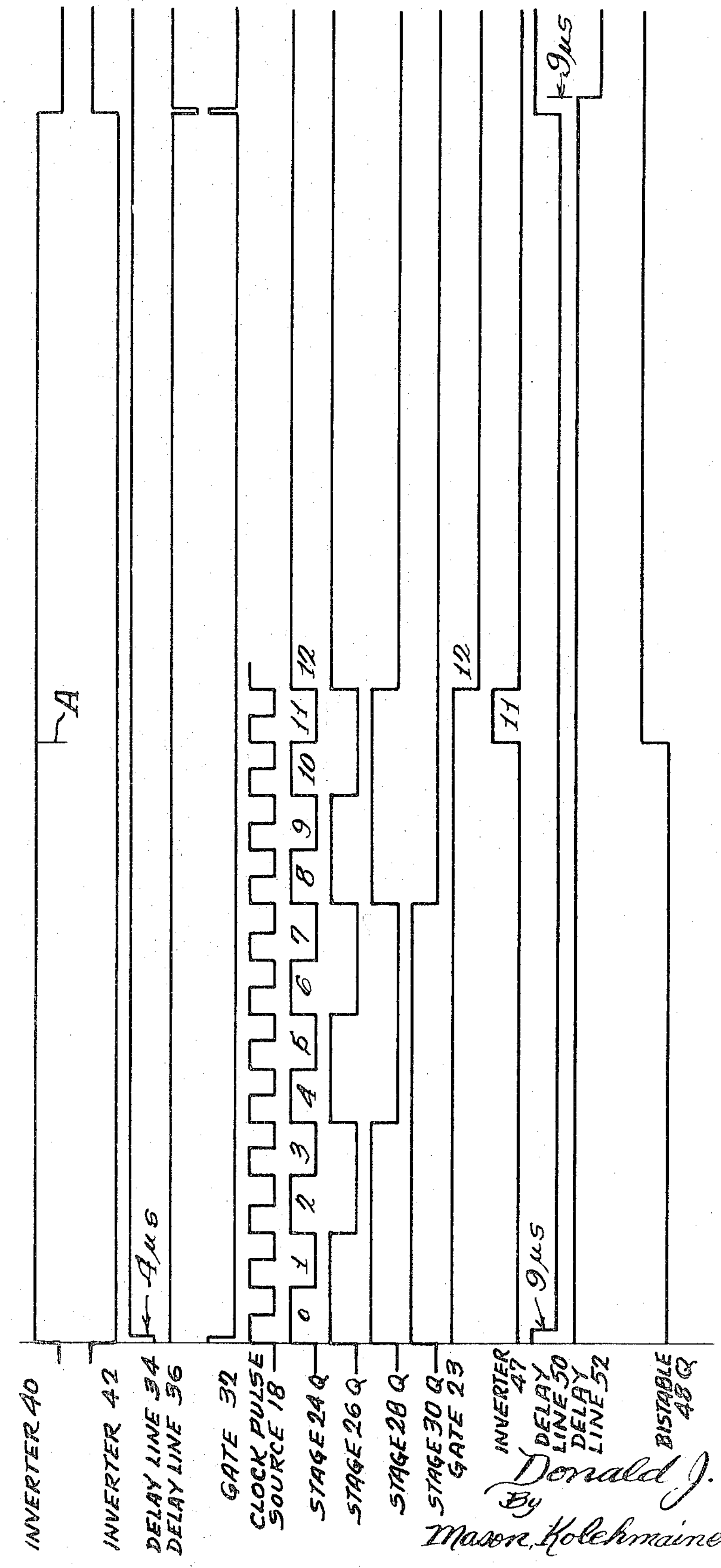
FIG. 2 illustrates a series of waveforms of various signals provided in the circuit shown in FIG. 1.

If, however, coincident with the leading edge of the pulse provided by the inverter 47, the level of the incoming line 16 momentarily shifts from a mark level to a space level, a negative-going signal shown at A in FIG. 2 is provided at the output of the inverter 40 which is applied to the input of the delay line 52. Without the 9 microsecond delay provided by the line 52, the DC signals applied to the J and K terminals of the flip-flop 48 would be in transition during the clocking of this flip-flop, and there is a distinct possibility that ambiguous signals would be applied to the data utilization device 22. However, with the 9 microsecond delay afforded by the line 52, a positive potential remains applied to the J terminal during the clocking interval, and the data utilization device 22 is provided with correct input signals. The delay line 50 affords the same protection against space-to-mark transitions in the incoming line 16 when a proper space signal has been timed out by the counter 12.

Although the present invention has been described with reference to a single illustrative embodiment thereof, it should be understood that numerous other modifications and embodiments can be devised by those skilled in the art that will fall within the spirit and scope of the principles of the present invention.

What is claimed and desired to be secured by Letters Patent of the United States is:

1. A noise rejection circuit for use with a signaling channel providing output signals of at least two different levels at a given bit rate comprising a counting circuit operable to different elapsed time settings from a normal setting, detecting means responsive to said output signals and operable to set said counting circuit to said normal setting in response to a change in the level of the output signal, a timing signal source coupled to the counting circuit and operable to advance the setting of the counting circuit from said normal setting to different settings representing different periods of elapsed time, said timing signal source providing timing signals the frequency of which is related to said given bit rate to provide the desired timing tolerance, output signal utilizing means, and means coupled between the counting circuit and the output signal utilizing means for rendering the output signal utilizing means responsive to the output signals when the counting circuit reaches a given setting representing a known period of elapsed time since the counting circuit was set to a normal setting by a change in the level of the output signal.

2. A noise rejection circuit for use with signaling systems having a signaling channel providing output signals of at least two different levels comprising a counting circuit having a plurality of stages and operable to place the stages in different patterns of conductive conditions, a timing signal source for operating the counting circuit, a first control means coupled to the channel and responsive to a change in the level of the output signal for rendering the timing signal source effective to operate the counting circuit, an output signal utilization means supplied with the output signals, and a second control means coupled to the counting circuit and the utilization means and responsive to the stages in the counting circuit being placed in a predetermined pattern of conductive conditions for rendering the utilization means responsive to control by said output signals.

3. The noise rejection circuit set forth in claim 2 in which the first control means includes presetting means for presetting the stages of the counting circuit to a given pattern of conductive conditions, and means supplied with the output signals for operating the presetting means each time the output signal changes from one level to another level.

4. The noise rejection circuit set forth in claim 3 in which the first control means includes logic gate means coupled to the timing signal source and the counting circuit and controlled by the pattern of conductive states of the stages for supplying operating signals to the counting circuit.

5. A noise rejection circuit for use with a signaling channel providing output signals of at least two different levels comprising a plural stage counting circuit having an input and being operable to settings in which the stages provide different patterns of conductive conditions, a timing signal source providing a series of timing signals, first logic gate means having inputs coupled to the signal source and the stages of the counting circuit and having an output coupled to the input of the counting circuit, detecting means responsive to the output signals and operative to set the stages of the counting circuit to a first given pattern of conductive conditions each time that the level of the output signals changes, said first logic circuit means being enabled to supply timing signals to the input of the counting circuit when the stages of said counting circuit are set to said first given pattern of conductive conditions and being inhibited when the stages of said counting circuit are set to a second given pattern of conductive conditions repersenting a known period of elapsed time, signal utilizing means adapted to be operated by said output signals from the signaling channel, and control means coupled to the signal utilizing means and controlled in accordance with the pattern of the conductive state of the stages in the counting circuit for rendering the signal utilizing means responsive to control by the output signals.

6. The noise rejection circuit set forth in claim 5 in which the signal utilizing means includes a gated bistable means having a gate input, and the control means includes second logic gate means coupled between the stages of the counting circuit and the gate input to the bistable means.

7. The noise rejection circuit set forth in claim 5 in which the control means includes second logic gate means coupled to the stages of the counting circuit and responsive to the setting of the stages to a known pattern of conductive conditions representing an elapsed time no longer than said known period of elapsed time for rendering the signal utilizing means responsive to control by the output signals.

References Cited

UNITED STATES PATENTS

| | | | |
|---|---|---|---|
| 3,045,063 | 7/1962 | Von Sanden | 178—70 |
| 3,381,245 | 4/1968 | Guanella | 178—69 |

KATHLEEN H. CLAFFY, Primary Examiner

D. W. OLMS, Assistant Examiner